(12) United States Patent
Amaya et al.

(10) Patent No.: US 7,345,767 B2
(45) Date of Patent: Mar. 18, 2008

(54) METHOD FOR MEASURING OPTICAL-PHASE DISTRIBUTION

(75) Inventors: Kenji Amaya, Tokyo (JP); Masashi Ueshima, Tokyo (JP)

(73) Assignee: The Circle for the Promotion of Science and Engineering, Tokyo (JP)

( * ) Notice: Subject to any disclaimer, the term of this patent is extended or adjusted under 35 U.S.C. 154(b) by 185 days.

(21) Appl. No.: 11/359,126

(22) Filed: Feb. 21, 2006

(65) Prior Publication Data

US 2006/0187467 A1    Aug. 24, 2006

(30) Foreign Application Priority Data

Feb. 22, 2005    (JP)    ............................. 2005-045064

(51) Int. Cl.
*G01N 21/55*    (2006.01)

(52) U.S. Cl. ...................................... 356/445

(58) Field of Classification Search .................... None
See application file for complete search history.

(56) References Cited

OTHER PUBLICATIONS

Nugent, K., et al., "A Phase Odyssey", *Physics Today*, vol. 54, No. 8, pp. 27-32 (2001).
Takashi, M., "Hikari-Oyo Nano In-Purosesu Keisou-Gijutsu no Saisin-Doko (The Latest Trend in Nano In-Process Measurement Technology by Optical Application", *Kikai no Kenkyu (Science of Machine)*, vol. 54, No. 9, pp. 928-933 (2002).
"Opto-Electronic Measuring Instrument Guide", Optoelectronics Co., Ltd., 1998.
Southwell, W.H., "Wavefront Estimation from Wavefront Slope Measurements", *Journal of Optical Society of America*, vol. 70, No. 8, pp. 998-1005 (1980).
Schiskie, P., "Uniqueness and Ambiguity in Phase Determination from Image and Diffraction Pattern Intensities", *Optik*, vol. 40, No. 3, pp. 261-275 (1974).
Takeaki, Y., "Hikari Johokogaku no Kisu (Fundamentals of Optical Information Engineering)", Corona Publishing Co., (2000).
Yabe, et al., "Hisenkei Keikakuho (Nonlinear Programming)" Asakura Shoten Publishing Co., Ltd. (1999).
Kenro, M., "Kogaku Nyumon (Introduction to Optics)", Iwanami Shoten Publishing Co., Ltd (1995).

*Primary Examiner*—Michael P. Stafira
(74) *Attorney, Agent, or Firm*—Ladas & Parray LLP

(57) ABSTRACT

A provided optical-phase-distribution measuring method, by which optical phase distribution is identified at high speed and with high accuracy from information on light-intensity distribution without using a special measuring device, comprises steps: for inputting light to be measured to optical systems, respectively, modulating the intensity and the phase, detecting the output light to be measured with CCD, and measuring the intensity distribution of detected light to be measured as an image with an optical-phase-distribution measuring system provided with the two different optical systems; for setting an observation equation, based on the intensity distribution and on the optical characteristics of the optical systems; for setting a phase-distribution identification inverse-problem from the observation equation, and formulating the set phase-distribution identification inverse-problem as a first nonlinear optimization problem in which complex amplitude representing the light to be measured is assumed to be a design variable; for converting the first nonlinear optimization problem to a second nonlinear optimization problem, in which expansion coefficients in a series expansion are assumed to be design variables, by series expansion of the phase distribution of the light to be measured; and for identifying the phase distribution of the light to be measured by solving the second nonlinear optimization problem.

7 Claims, 5 Drawing Sheets

METHOD FOR MEASURING OPTICAL-PHASE DISTRIBUTION

REFERENCES CITED

[Non-Patent Document 1]: K. A. Nugent, D. paganin, and T. E. Gureyev, "A Phase Odyssey", Physics Today, Vol. 54, No. 8, pp 27-32, 2001;

[Non-Patent Document 2]: MIYOSHI Takashi, "HIKARI-OYO NANO IN-PUROSESU KEISOKU-GIJUTSU NO SAISIN-DOKO (The Latest Trend in Nano In-Process Measurement Technology by Optical-Application", KIKAI NO KENKYU (Science of Machine), Vol. 54, No. 9, pp 928-933, 2002;

[Non-Patent Document 3]: "Opto-Electronic Measuring Instrument Guide", OPTOELECTRONICS Co., LTd., 1998;

[Non-Patent Document 4]: W. H. Southwell, "Wavefront Estimation from Wavefront Slope Measurements", J. Opt. Soc. Am., Vol. 70, No. 8, pp 998-1005, 1980;

[Non-Patent Document 5]: P. Schiske, "Uniqueness and Ambiguity in Phase Determination From Image and Diffraction Pattern Intensities", Optik, Vol. 40, No. 3, pp 261-275, 1974;

[Non-Patent Document 6]: YOSHIMURA Takeaki, "HIKARI JOHOKOGAKU NO KISO (Fundamentals of Optical Information Engineering)", Corona Publishing Co., Ltd. 2000;

[Non-Patent Document 7]: YABE AND YAMAKI, "HISENKEI KEIKAKUHO (Nonlinear Programming)", ASAKURA SHOTEN Publishing Co., Ltd. 1999; and

[Non-Patent Document 8]: MIYAMOTO Kenro, "KOGAKU NYUMON (Introduction to Optics)", IWANAMI SHOTEN Publishing Co., Ltd., 1995.

CROSS-REFERENCE TO RELATED APPLICATIONS

The present application claims the benefit of patent application number 2005-045064, filed in Japan on Feb. 22, 2005, the subject matter of which is hereby incorporated herein by reference.

BACKGROUND OF THE INVENTION

1. Field of the Invention

The present invention relates to a method for measuring optical-phase distribution, and, more particularly, relates to a method for measuring optical-phase distribution (optical-phase-distribution measuring method) by which optical-phase distribution can be easily and economically measured at high speed and with high accuracy.

2. Description of the Related Art

The optical-phase distribution (hereafter, also called optical phase-distribution in some cases) includes information on: the wavefront shape of a light source; the refractive index distribution of a transmitting object; the surface shape of a reflecting object; and the like. It is required in many fields, for example, for design evaluation of an optical system; quality control of an optical element such as a semiconductor laser element and a lens; surface-shape measurements for noncontact nondestructive inspection, microscopic observations, and the like; and adaptive optics used for wavefront shaping and celestial observations. A quantitative measurement of the optical phase distribution is very important for engineering. Recently, measurement of a phase distribution called aberration analysis has been a necessary and indispensable technology for evaluation of an information write-and-read device using a laser, wherein the device is typified, especially, by a DVD pickup (refer to the non-patent documents 1 and 2).

For example, a method (hereinafter, called an optical-phase-distribution measuring method using an interferometer) (refer to the non-patent document 3), by which relative phase distribution of light to be measured and reference light is obtained, using an interferometer, and a method (hereinafter, called an optical-phase-distribution measuring method according to a Shack-Hartman sensor) (refer to the non-patent document 4), by which phase-gradient distribution is detected with the Shack-Hartman sensor to obtain the phase distribution, have been included so far as a method by which optical-phase distribution is measured, using hardware (that is, a special measuring device)

However, there have been a problem that the special measuring device (that is, hardware such as an interferometer, and a Shack-Hartman sensor), which has been used in the above-described conventional optical-phase-distribution measuring method, is very expensive, because the special measuring device includes a precise optical instrument, and space for installing the above special measuring device is required. There has also been a problem that efforts for measuring adjustments and measuring errors are increased when the scale of the phase distribution for light to be measured is in the level of a wavelength.

SUMMARY OF THE INVENTION

The present invention has been made, considering the above-described circumstances, and an object of the invention is to provide an optical-phase-distribution measuring method, by which the optical-phase distribution can be measured, without using a special measuring device, by identifying optical phase distribution at high speed and with high accuracy from information on light intensity distribution which can be easily measured.

The present invention relates to an optical-phase-distribution measuring method, by which a phase distribution of a light to be measured can be measured at high speed and with high accuracy, and the above-described object of the present invention can be effectively achieved by comprising: an intensity-distribution measuring step in which an optical-phase-distribution measuring system comprised of two different optical systems with known optical characteristics (a first optical system and a second optical system) and at least a light-wave detecting sensor is used, said light to be measured is input to said first optical system and said second optical system respectively, intensity and phase of said light to be measured are modulated, said light to be measured which has been output is detected by said light-wave detecting sensor, and an intensity distribution of said light to be measured which has been detected is measured as an image; an observation-equation setting step in which based on said intensity distribution obtained at said intensity-distribution measuring step, optical characteristics of said first optical system, and optical characteristics of said second optical system, an observation equation of said optical-phase-distribution measuring system is set; a first nonlinear-optimization-problem formulating step in which from said observation equation, a phase-distribution identification inverse-problem by which said phase distribution of said light to be measured is identified is set, and said phase-distribution identification inverse-problem which has been set is formulated as a first nonlinear optimization problem in which a complex amplitude representing said light to be measured is assumed to be a design variable; a second nonlinear-optimization-problem formulating step in which by performing series expansion of said phase distribution of said light to be measured, said first nonlinear optimization problem is converted to a second nonlinear optimization problem in which expansion coefficients in a series expansion expression are assumed to be design variables; and a phase-distribution identifying step in which said phase distribution of said light to be measured is identified by solving said second nonlinear optimization problem.

Moreover, the above-described object of the present invention can be further effectively achieved by a configuration in which, wherein g is said complex amplitude representing said light to be measured, $[H_1]$ is a system matrix representing optical characteristics of said first optical system, $[H_1]^{-1}$ is an inverse matrix of $[H_1]$, and $[H_2]$ is a system matrix representing optical characteristics of said second optical system, $f_1$ is a complex amplitude representing detected light passing through said first optical system, $f_2$ is a complex amplitude representing detected light passing through said second optical system, when symbols in said observation equation are replaced by $[H] \leftarrow [H_2][H_1]^{-1}$, $g \leftarrow f_1$ and $f \leftarrow f_2$, said observation equation is expressed by the following expression, $$[H]g=f, |g|=\bar{g}, |f|=\bar{f}$$

objective function of said first nonlinear optimization problem is represented by the following expression.

$$\||Hg|^2 - |f|^2\|^2 \to \min$$

or by a configuration in which, wherein said phase distribution $\phi$ of said light to be measured is expanded to a Zernike circle polynomial, Zernike coefficients are assumed to be design variables for said second nonlinear optimization problem, and objective function of said second nonlinear optimization problem is represented by the following expression, $$\||Hg(\phi(z))|^2 - |f|^2\|^2 \to \min$$

where z is a vector comprising a predetermined number of Zernike coefficients.

or by a configuration in which, wherein said phase-distribution identifying step comprising: Step 1 in which an initial value of a Zernike coefficient z is set; Step 2 in which said phase distribution $\phi$ of said light to be measured is calculated based on $\phi=[W]z$; Step 3 in which said complex amplitude g representing said light to be measured is calculated based on $g=g(\phi)$; Step 4 in which complex amplitude f on a first virtual border of said light to be measured is calculated based on $f=[H]g$; Step 5 in which from said complex amplitude on said first virtual border of said light to be measured which has been calculated at Step 4, light intensity is calculated, calculated light intensity and light intensity detected with said light-wave detecting sensor are compared, and the processing is ended when it is proved by compared result that objective function of said second nonlinear optimization problem reaches a minimum point, on the other hand, the processing proceeds to Step 6 when it is proved by compared result that objective function of said second nonlinear optimization problem does not reach said minimum point; and Step 6 in which the processing returns to Step 2 after correcting said Zernike coefficient z.

or by a configuration in which, wherein said complex amplitude f on said first virtual border of said light to be measured which is calculated at Step 4, can be obtained by performing operations of the following Steps A1 to A3: Step A1 for obtaining g* by two-dimensional Fourier transform of said complex amplitude g representing said light to be measured; Step A2 for calculating $f^* = h^* \cdot g^*$; and Step A3 for obtaining said complex amplitude f on said first virtual border of said light to be measured by two-dimensional inverse Fourier transform of f*.

or by a configuration in which, wherein the following Kirchhoff's integral equation is applicable to said first optical system and said second optical system, $$u(P) = -\int_\Gamma (q^*(P,Q)u(Q) - \phi^*(P,Q)q(Q))d\Gamma(Q)$$

by directly solving said Kirchhoff's integral equation under the assumption that a complex amplitude u on a virtual border $\Gamma$ is a boundary condition, q on said virtual border $\Gamma$ can be derived without making special assumption on said light to be measured, and then, a relation between said complex amplitude u on said virtual border $\Gamma$ and a complex amplitude u(P) of a point P can be obtained.

Furthermore, the above-described object of the present invention can be effectively achieved by comprising:

an intensity-distribution measuring step in which an optical-phase-distribution measuring system comprised of a plurality of different optical systems with known optical characteristics and at least one light-wave detecting sensor is used, said light to be measured is input to said plurality of optical systems respectively, intensity and phase of said light to be measured are modulated, said light to be measured which has been output is detected by said light-wave detecting sensor, and an intensity distribution of said light to be measured which has been detected is measured as an image; an observation-equation setting step in which based on said intensity distribution obtained at said intensity-distribution measuring step and each optical characteristics of said plurality of optical systems, an observation equation of said optical-phase-distribution measuring system is set; a first nonlinear-optimization-problem formulating step in which from said observation equation, a phase-distribution identification inverse-problem by which said phase distribution of said light to be measured is identified is set, and said phase-distribution identification inverse-problem which has been set is formulated as a first nonlinear optimization problem in which a complex amplitude representing said light to be measured is assumed to be a design variable; a second nonlinear-optimization-problem formulating step in which by performing series expansion of said phase distribution of said light to be measured, said first nonlinear optimization problem is converted to a second nonlinear optimization problem in which expansion coefficients in a series expansion expression are assumed to be design variables; and a phase-distribution identifying step in which said phase distribution of said light to be measured is identified by solving said second nonlinear optimization problem.

According to the optical-phase-distribution measuring method of the present invention, there is an excellent advantage that optical-phase distribution can be easily and economically measured, because the phase distribution of light to be measured can be identified at high speed and with high accuracy, based on information (intensity-distribution image) on light-intensity distribution, without using an expensive optical instrument such as a special measuring device which has been used in a conventional optical-phase-distribution measuring method, wherein the light-intensity distribution is obtained by using an optical-phase-distribution measuring system comprising two different optical systems and a light-wave detecting sensor.

DETAILED DESCRIPTION OF THE INVENTION

Hereinafter, the best mode for carrying out the invention will be explained, referring to drawings.

<1> Mathematical Expression of Light Wave and an Optical-phase-distribution Measuring System First, the mathematical expression of a light wave used in the present invention will be explained.

It is assumed in the present invention that light which is an object for measuring phase-distribution (that is, light to be measured) is, a monochromatic light with a single wavelength component, and a time coherent light in which there is a fixed correlation between phases at any different time such as a laser beam.

In the present invention, the time vibrational term of a light wave u is separated for calculation in optics, and, complex amplitude v, the intensity a of a light wave and a phase θ of a light wave are expressed by the following Expression 1 (refer to the non-patent document 6).

$$u = a\exp[i(\theta - \omega t)] = v\exp(-i\omega t) \quad \text{[Expression 1]}$$

where i represents an imaginary number, Ω represents an angular frequency, and t represents time.

Subsequently, an optical-phase-distribution measuring system used in the present invention will be explained.

Figure 1:
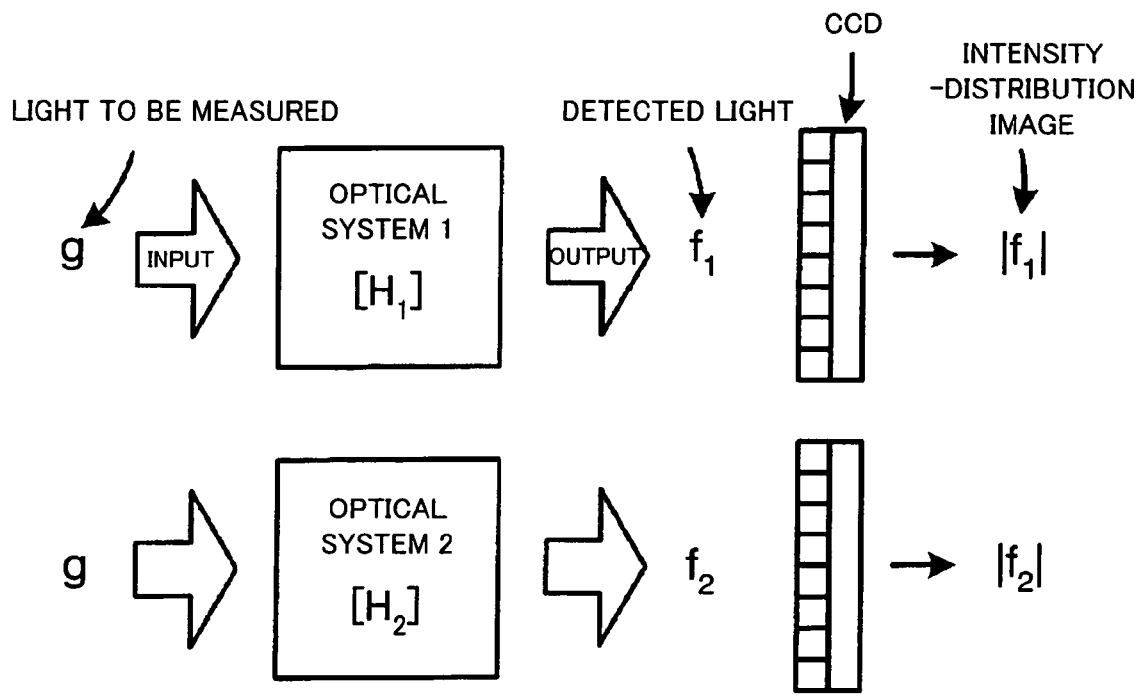
FIG. 1 is a view explaining the measuring principle and the mathematical model of the optical-phase-distribution measuring system used in the present invention.

FIG. 1 is a view explaining the measuring principle of the optical-phase-distribution measuring system used in the present invention. As shown in FIG. 1, the optical-phase-distribution measuring system comprises two different optical systems with known optical characteristics and two light-wave detecting sensors. Though it is preferable to use a CCD image-capturing element as a light-wave detecting sensor in the optical-phase-distribution measuring system, the above sensor is not limited to the CCD image-capturing element, and other sensors may be used therefor. In this embodiment, the CCD image-capturing element is used as the light-wave detecting sensor.

In the present invention, the phase distribution of the light to be measured can be measured by a configuration in which an intensity-distribution image of light to be measured is measured with the light-wave detecting sensor (CCD), using such an optical-phase-distribution measuring system, and, based on information on the obtained intensity-distribution image of the light to be measured, and on the optical characteristics of the optical system, and the like, the phase distribution of the light to be measured is identified, using the after-described optical-phase-distribution measuring method.

Though, in the present invention, monochromatic light with a single wavelength component is used as described above, as an object (that is, light to be measured) which is required to be measured for obtaining optical-phase distribution, the present invention can be applied by picking out only the wavelength component to be noted through a filter provided before the light-wave detecting sensor (CCD) to a case, for example, in which the light to be measured comprises a light wave with a wavelength other than the wavelength component to be noted.

Hereinafter, the measuring principle and a mathematical model of the optical-phase-distribution measuring system will be explained, referring to FIG. 1. As shown in FIG. 1, the optical-phase-distribution measuring system comprises two different optical systems (optical system 1 and optical system 2) with known optical characteristics and two light-wave detecting sensors (two CCDs).

According to a mathematical expression of the measuring principle of the optical-phase-distribution measuring system, a complex vector g (that is, the complex amplitude of the light to be measured, and, hereinafter, simply called complex amplitude), which represents the light to be measured, is converted to a complex vector $f_1$ representing detected light which has passed the optical system 1, by using a conversion matrix $[H_1]$ decided by the optical system 1, and the complex vector g representing the light to be measured is converted to a complex vector $f_2$ representing detected light which has passed the optical system 2, by using a conversion matrix $[H_2]$ decided by the optical system 2. That is, relations between the light to be measured and detected light can be expressed by the after-described Expressions 2 and 3.

Here, a real number vector arranging absolute values of components of complex vectors $f_1$, $f_2$ representing detected light is detected by the light-wave detecting sensors (CCDs).

In other words, the intensity of light, that is, the absolute value of a complex amplitude is measured as an image which has been received and detected in the light-wave detecting sensors such as CCDs. Though the space distribution of the measured intensity of light is given in a two-dimensional discrete array, the space distribution is expressed as a complex vector in which complex amplitude representing a light wave is discretely rearranged in a one-dimensional manner in the present invention, when the distribution of the complex amplitude is treated.

In addition, in the present invention, any optical system can be applied to the optical-phase-distribution measuring system, if the optical system has known optical characteristics. For example, a lens, defocusing of a lens, lenses with different pupil functions, a diffraction grating, and diffraction in the air (that is, direct incidence without an optical system) can be easily used.

<2> Observation Equations of the Optical-phase-distribution Measuring System

Input light (that is, light to be measured) g is discretely divided into n beams of light to obtain $g \in C^n$, and two beams of light passing through two different optical systems (optical systems 1 and 2) are discretely divided to m beams of light, respectively, to obtain $f_1, f_2 \in C^m$, and conversion matrices decided by the optical systems 1 and 2 are assumed to be $[H_1], [H_2] \in C^{m \times n}$, respectively. And, when the intensity distribution (the square of the amplitude) of the detected light measured by CCD as the light-wave detecting sensor is assumed to be $\bar{f}_1^2, \bar{f}_2^2 \in R^m$, the observation equations of the optical-phase-distribution measuring system can be expressed by the following Expressions 2, 3, 4, and 5.

$$[H_1]g = f_1 \quad \text{[Expression 2]}$$

$$[H_2]g = f_2 \quad \text{[Expression 3]}$$

$$|f_1| = \bar{f}_1 \quad \text{[Expression 4]}$$

$$|f_2| = \bar{f}_2 \quad \text{[Expression 5]}$$

However, it is assumed that a vector $|v|$ expressed in the form of the Expressions 4 and 5 is a real number vector arranging absolute values of a complex number v.

$$|v| \equiv (|v_1|, |v_2|, \ldots, |v_n|)^T \quad \text{[Expression 6]}$$

The above-described Expression 2 is a conversion formula which converts light to be measured (g) into detected light ($f_1$) through the optical system 1, and the above-described Expression 3 is a conversion formula which converts light to be measured (g) into detected light ($f_2$) through the optical system 2. And, the above-described Expression 4 represents that the absolute-value vector $|f_1|$ of a complex vector $f_1$ representing detected light is given as measured intensity $\bar{f}_1$, that is, the absolute-value vector $|f_1|$ is a measurand. The above-described Expression 5 represents that the absolute-value vector $|f_2|$ of a complex vector $f_2$ representing detected light is given as measured intensity $\bar{f}_2$.

Here, known parameters are a complex matrix $[H_1]$ representing the optical characteristics of the optical system 1, a complex matrix $[H_2]$ representing the optical characteristics of the optical system 2, and absolute-value vectors $\bar{f}_1, \bar{f}_2$ representing the intensity of detected light which has been measured. Unknown parameters are a complex vector g representing light to be measured, and complex vectors $f_1, f_2$ representing detected light.

<3> Reduce to a Nonlinear Optimization Problem

The observation equations of the optical-phase-distribution measuring system, which are represented by the above-described Expressions 2, 3, 4, and 5, can be simplified to the observation equations represented by the following Expressions 7, 8, 9, and 10.

$$g = [H_1]^{-1} f_1 \quad \text{[Expression 7]}$$

$$[H_2][H_1]^{-1} f_1 = f_2 \quad \text{[Expression 8]}$$

$$|f_1| = \bar{f}_1 \quad \text{[Expression 9]}$$

$$|f_2| = \bar{f}_2 \quad \text{[Expression 10]}$$

Where $[H_1]^{-1}$ is an inverse matrix for the system matrix $[H_1]$ of the optical system 1. However, when there is no inverse matrix of the system matrix (a complex matrix representing the optical characteristics of the optical system) for the optical system, for example, a general inverse matrix is introduced. And, when the intensity of light to be measured g is observed, $[H_1]$ becomes a unit matrix. First, the Expressions 8, 9, and 10 are solved to obtain $f_1$. Then, g can be obtained by using the Expression 7.

Here, when symbols in the observation equations represented by the Expressions 7, 8, 9, and 10 are replaced as shown in $[H] \leftarrow [H_2][H_1]^{-1}$, $g \leftarrow f_1$ and $f \leftarrow f_2$, observation equations represented by Expressions 11, 12, and 13 are obtained.

$$[H]g = f \quad \text{[Expression 11]}$$

$$|g| = \bar{g} \quad \text{[Expression 12]}$$

$$|f| = \bar{f} \quad \text{[Expression 13]}$$

In the optical-phase-distribution measuring method of the invention, since the object of the optical-phase-distribution measuring method according to the present invention is to obtain the phase distribution of the light to be measured, the complex amplitude of the light to be measured is identified in the method. That is, a phase-distribution identification inverse-problem in which a complex vector (complex amplitude) g which represents the light to be measured satisfying the observation equations represented by the above-described Expressions 11, 12, and 13 is identified will be solved, assuming that the intensity of the light to be measured by CCD as the light-wave detecting sensor is a observation parameter.

However, it is difficult to directly obtain light to be measured g, which satisfies the observation equations represented by the above-described Expressions 11, 12, and 13, because the above observation equations are nonlinear equations.

Then, in the present invention, the phase-distribution identification inverse-problem for obtaining light to be measured g is formulated as a nonlinear optimization problem. In the formulated nonlinear optimization problem, a design variable is assumed to be a complex vector g representing the light to be measured, and a nonlinear objective function (evaluation function) represented by the following Expression 14 is set:

$$\||Hg|^2 - |f|^2\|^2 \to \min \quad \text{[Expression 14]}$$

That is, a phase-distribution identification problem for the light to be measured g can be reduced to the nonlinear optimization problem having the evaluation function represented by the Expression 14 under the assumption that g is a design variable.

Further, in the present invention, a phase-distribution identification problem for the light to be measured g can be reduced to the nonlinear optimization problem having the evaluation function represented by the following expression under the assumption that g is a design variable.

$$\||H_1 g|^2 - |f_1|^2\|^2 + \||H_2 g|^2 - |f_2|^2\|^2 \to \min$$

where, symbols g, $f_1$, $f_2$, $H_1$ and $H_2$ in the above expression have the same meaning as symbols g, $f_1$, $f_2$, $H_1$ and $H_2$ used in expressions 7, 8, 9 and 10.

Although we explained the optical-phase-distribution measuring system comprised of two different optical systems with known optical characteristics and a light-wave detecting sensor as described above, an optical-phase-distribution measuring system used in the present invention is not limited to this construction, and can be comprised of more than two different optical systems with known optical characteristics and a light-wave detecting sensor.

In this case, a phase-distribution identification problem for the light to be measured g can be reduced to the nonlinear optimization problem having the evaluation function represented by the following expression under the assumption that g is a design variable.

$$\sum_{i=1}^{n} |||H_i g|^2 - |f_i|^2|| \to \min$$

where, n is the number of different optical systems used in the optical-phase-distribution measuring system. $H_i$ is a system matrix representing optical characteristics of i-th optical system. $f_i$ is a complex amplitude representing detected light passing through i-th optical system.

Figure 2:
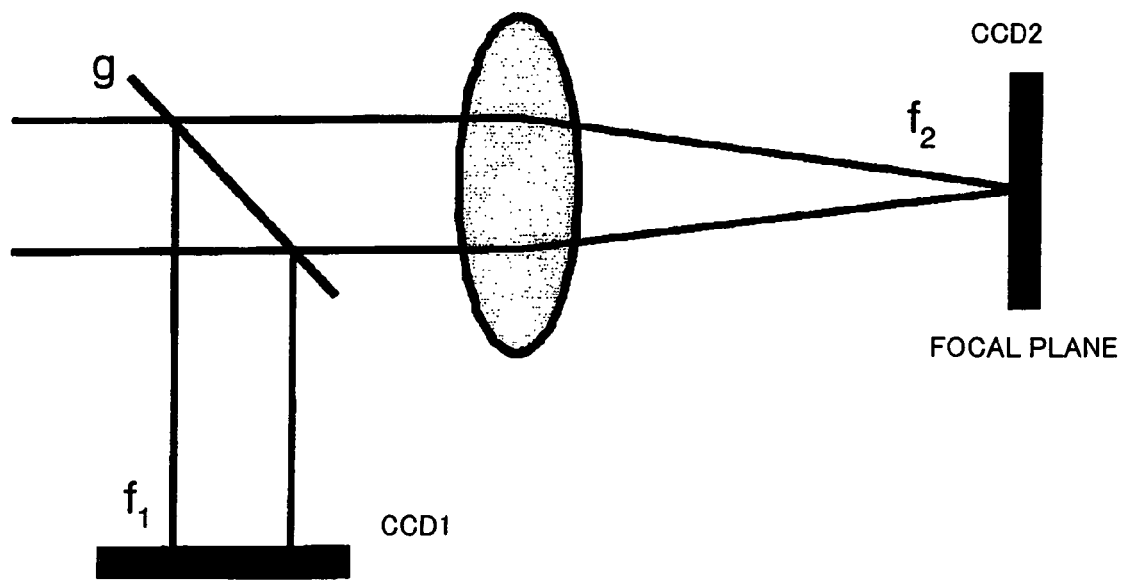
FIG. 2 is a view explaining one example of specific optical system in an optical-phase-distribution measuring system used in the present invention.

Then, one example of specific optical system in an optical-phase-distribution measuring system used in the present invention will be explained, referring to FIG. 2. In the optical system shown in FIG. 2, g is directly observed, and $H_1$ becomes a unit matrix to obtain $[H]=[H_2][I]$. Moreover, the following Expression 15 holds when the observation plane of $f_2$ is placed on the focal plane of a lens as shown in FIG. 2

$$[H_2]\{g\}=F(g) \qquad \text{[Expression 15]}$$

Where F(g) represents Fourier transform of g.

<4> Series Expansion of Phase Distribution of Light to be Measured

Subsequently, in the optical-phase-distribution measuring method according to the present invention, the nonlinear optimization problem (hereinafter, simply called a first nonlinear optimization problem) with the evaluation function represented by the Expression 14 is converted to the after-described a second nonlinear optimization problem under the assumption that g is a design variable by using series expansion of phase distribution of light to be measured g.

Then, the following Expression 16 holds under the assumption that $g_i$ is the i-th component of the light to be measured g (complex amplitude), $\overline{g_i}$ is the intensity of the i-th component of the light to be measured g which is measured by CCD, and $\phi_i$ is the phase angel of the i-th component of the light to be measured g.

$$g_i = \overline{g_i} \exp(i\phi_i) \qquad \text{[Expression 16]}$$

A relation between the light to be measured g (complex amplitude) and the phase of the light to be measured is expressed as $g(\phi)$ for the whole distribution.

The phase distribution $\phi$ of the light to be measured is expanded to a Zernike circle polynomial as shown in the following Expression 17.

$$\phi(r, \theta) = \sum_{j}^{\infty} W_j(r, \theta) \times z_j \qquad \text{[Expression 17]}$$

Where r and θ represent polar coordinate components on a screen. In the Zernike circle polynomial, $W_j$ is a basis function and $z_j$ is a coefficient. In the Expression 17, when terms of higher orders than l-th order are disregarded and the screen plane is spatially made discrete, the following Expression 18 is obtained as the vector expression of the phase distribution of the light to be measured.

$$\phi=[W]z \qquad \text{[Expression 18]}$$

Where [W] is a matrix in which l vectors obtained by making basis functions of the Zernike circle polynomial discrete are horizontally arranged. And, z is a vector including l coefficients of the Zernike circle polynomial.

In the present invention, terms of higher orders than l-th order are disregarded at series expansion of phase distribution of the light to be measured, because study of measured results with an interferometer has proved that, according to evaluation of an optical element such as lens and DVD pickup, which are actually used in an industrial manner, the distribution of the phase (aberration) is comparatively smooth, and the phase distribution can be expressed enough, using about 30 through about 70 terms in the series of the Zernike circle polynomial. In a word, the phase distribution of the light to be measured can be obtained only by identifying 30 through 70 unknowns in Zernike series expansion of the phase distribution of the light to be measured.

The optical-phase-distribution measuring method according to the present invention has a configuration in which components of complex amplitude for each pixel (each pixel referred to here means a plurality of components of discrete light waves) are not directly identified, but series expansion of the phase distribution of the light to be measured is performed, that is, series expansion with terms of low orders as shown, for example, in the Expression 18 is performed to identify a small number of expansion coefficients.

That is, the present invention has a configuration in which the phase distribution of the light to be measured is identified by reducing the phase-distribution identification problem to a nonlinear optimization problem (hereinafter, also called a second nonlinear optimization problem) with an evaluation function represented by a Expression 19 under assumption that the expansion coefficients for series expansion are design variables (Zernike coefficients in this example), and by solving the above second nonlinear optimization problem. Thereby, the second nonlinear optimization problem can be accurately and stably solved, and the calculation amount can be remarkably decreased.

$$||Hg(\phi(z))|^2 - |f|^2|| \to \min \qquad \text{[Expression 19]}$$

Here, for example, when the nonlinear optimization problem with the evaluation function represented by the Expression 14 is solved, without using the optical-phase-distribution measuring method according to the present invention, under the assumption that the design variable is g, a real part and a imaginary part of complex amplitude for each pixel are required to be identified, respectively. Generally, the total number of pixels in CCD as a light-wave detecting sensor is enormous, and the number of unknowns which are required to be identified is twice the total number n of pixels in an image, that is, 2n=64×64×2=8192 even for a grainy image with an image size of, for example, 64×64. In such a case, the nonlinear minimization problem with the evaluation function represented by the Expression 14 is put into an unfavorable state to cause a problem that the solution becomes unstable and the calculation amount becomes enormous.

However, though the example in which the phase distribution of the light to be measured is expanded by using the Zernike series has been explained above, the present invention is not limited to the above example, and, obviously, Fourier series expansion, Lagrange series expansion, expansion by using a spline function, Bessel-function expansion, and the like can be also applied to the present invention. Moreover, other than expansion of the phase distribution $\phi$, for example, direct expansion of complex amplitude g can obtain the same effect.

Furthermore, when it is expected that the phase distribution of the light to be measured is near a designed phase-distribution, the values of the terms (two right-side terms in the following Expression 20) after series expansion can be reduced, and the nonlinearity of an objective function can be lessened by expansion to a series like the following Expression 20 with a constant term of $\phi_0(x,y)$ under the assumption that the designed phase distribution is $\phi_0(x,y)$. Thereby, the calculation is efficiently performed to put the optimization problem into less unfavorable state.

$$\phi(x, y) = \phi_0(x, y) + \sum_j W_j(x, y) Z_j \qquad \text{[Expression 20]}$$

Considering a case in which the Expression 20 is applied as one example to measurement of the aberration of a lens, series expansion of only the portion of unit-to-unit variation in the aberration distribution is performed under the assumption that the design value of the aberration distribution of the lens is assumed to be $\phi_0(x,y)$. Moreover, though it has been known in application to measurement of aberrations of optical components that the aberration distribution tends to be the same as each other among optical components in each lot, similar advantages can be obtained in this case by assuming that the average value of the aberration distributions as the amount of statistics for measured components is $\phi_0(x,y)$.

In order to confirm the validity of the optical-phase-distribution measuring method according to the present invention, the phase distribution of light to be measured, in which true phase-distribution is known, was identified by using the optical-phase-distribution measuring method of the present invention. Hereinafter, the identification will be described. That is, light with phase distribution and intensity distribution, which had been known, was made to propagate through two kinds of optical systems of a lens focal-point system and a diffraction system, and the intensity distribution of the output light was obtained through calculation beforehand to include an error of 1% to the distribution. Then, the resulted distribution was assumed to be simulated data. The phase distribution was inversely identified by the optical-phase-distribution measuring method according to the present invention, using the above-simulated data, and the predetermined and known phase-distribution and the identified result according to the present invention were compared. Here, the amplitude distribution of the input light was assumed to be uniform distribution.

Figure 3:
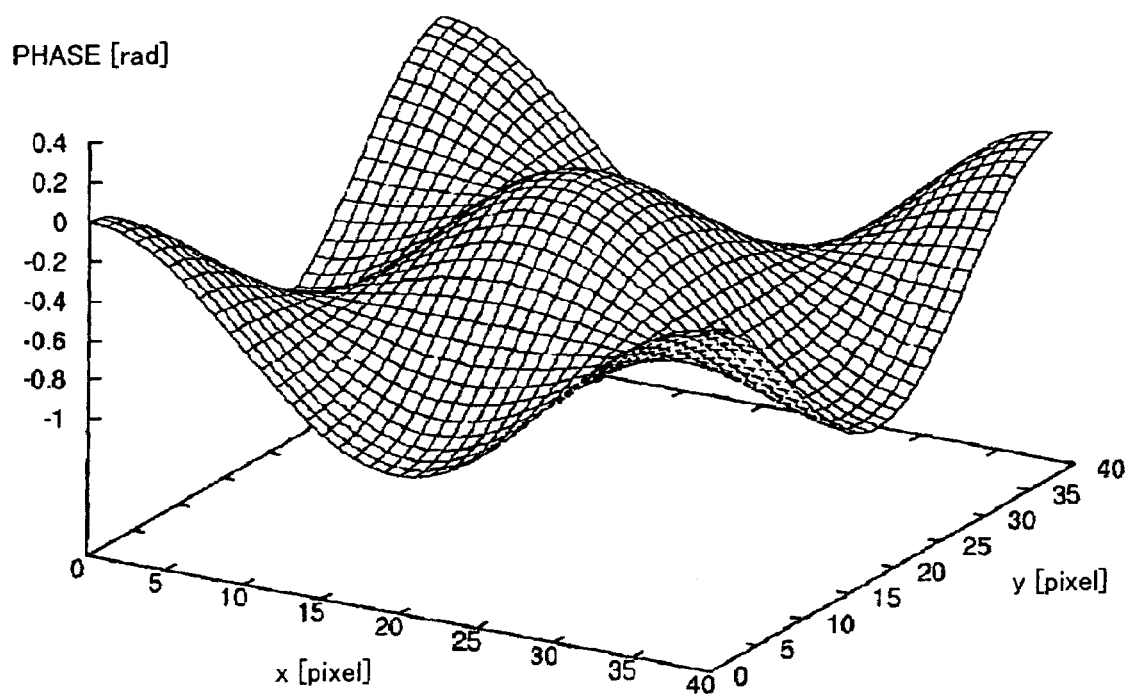
FIG. 3 is a view showing the true phase-distribution of light to be measured.
Figure 4:
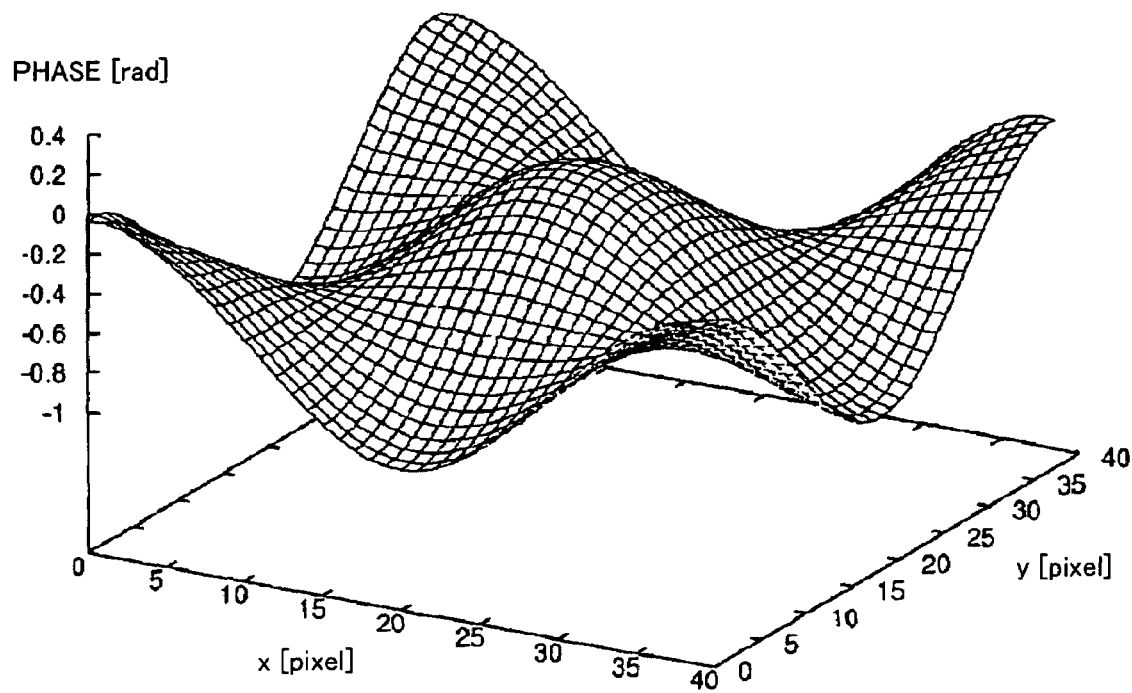
FIG. 4 is a view showing the phase distribution of light to be measured, which has been identified according to an optical-phase-distribution measuring method of the present invention.

Then, the known phase-distribution (true phase-distribution) of light to be measured is shown in FIG. 3, and the phase distribution of the light to be measured, which had been identified according to the optical-phase-distribution measuring method of the present invention, is shown in FIG. 4. Moreover, the average error of the calculated results according to the present invention was 0.012 [rad], and the calculation time was 209 [sec]. Accordingly, it was confirmed that the phase distribution of light to be measured could be estimated at high speed and with high accuracy, when the present invention was used.

<5> Mathematical Model for Propagating Light to be Measured

Subsequently, a system matrix representing the optical characteristics of the optical system of the optical-phase-distribution measuring system used in the present invention, that is, the transmission matrix for light propagation will be explained.

Figure 5:
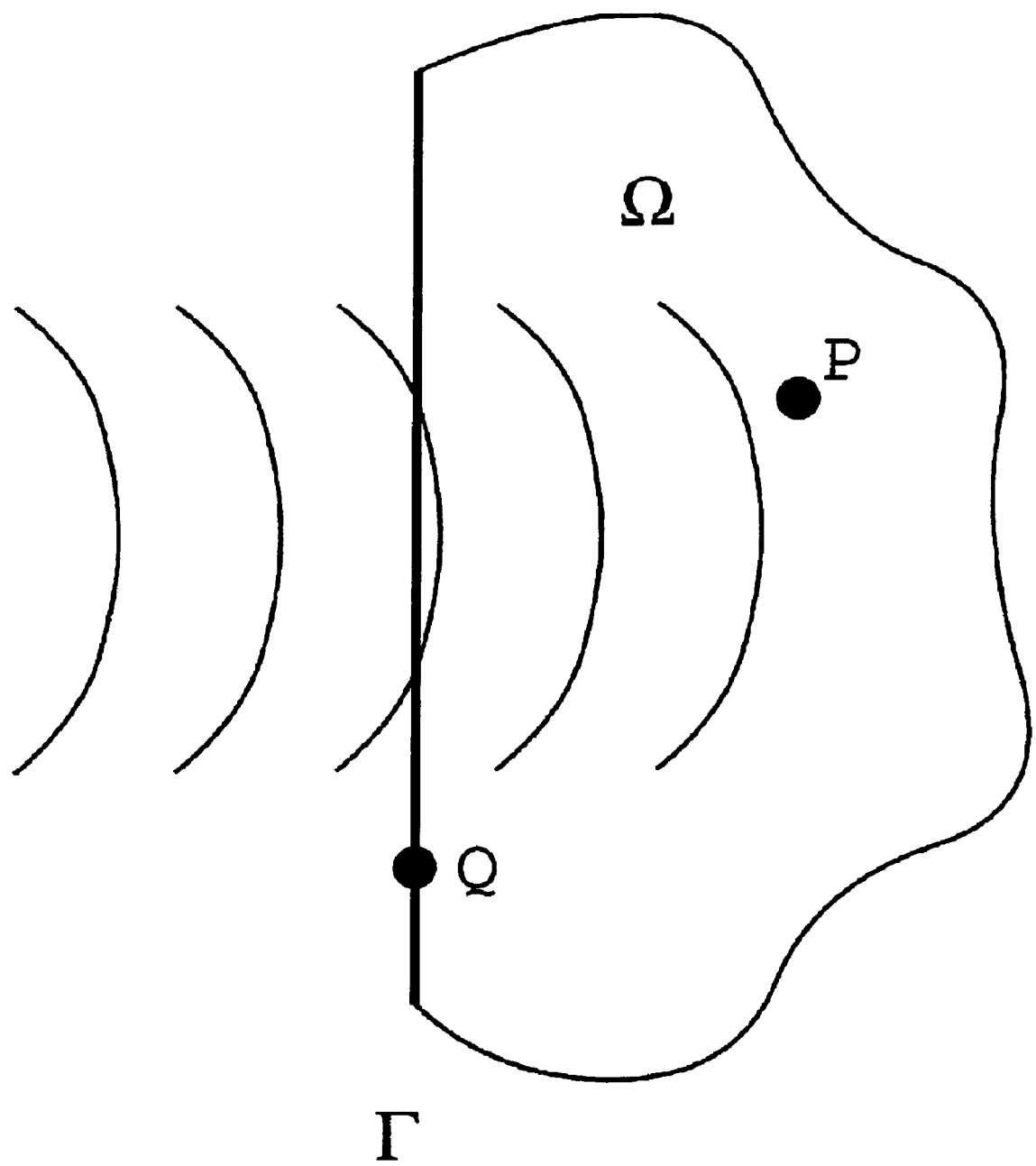
FIG. 5 is a view explaining the Kirchhoff's integral equation.

Incidentally, steady propagation of monochromatic light in uniform medium satisfies the Helmholtz equation represented by the following Expression 21.

$$\nabla^2 u + k^2 u = 0 \qquad \text{[Expression 21]}$$

Where u is the complex amplitude of light, and k is the wave number which is decided by the wavelength of the light. As shown in FIG. 5, let us consider a semi-infinite region $\Omega$ divided by a virtual border $\Gamma$. When the Expression 21 is multiplied by a three-dimensional basic solution of the Helmholtz equation for integration over the region $\Omega$, and partial integration is performed twice, the Kirchhoff's integral equation represented by a Expression 22 is obtained (refer to the non-patent document 8). Here, integration of the infinite border is neglected by considering the radiation condition of Sommerfeld.

$$u(P) = -\int_\Gamma (q^*(P,Q) u(Q) - \phi^*(P,Q) q(Q)) d\Gamma(Q) \qquad \text{[Expression 22]}$$

Where $\phi^*$ is a three-dimensional basic solution of the Helmholtz equation, and is represented by the following Expression 23.

$$\phi^* = \exp(-ikr)/4\pi kr \qquad \text{[Expression 23]}$$

Where r is a distance between a point P and a point Q.

Moreover, $q^*$ and $q$ are defined by the following Expression 24, and are differentiation of $\phi^*$ and u in the direction of an outward normal vector n to the virtual border $\Gamma$, respectively.

$$q^* \equiv \frac{\partial \phi^*}{\partial n} \qquad \text{[Expression 24]}$$
$$q \equiv \frac{\partial u}{\partial n}$$

In order to obtain the complex amplitude u(P) of an arbitrary point P in the region $\Omega$ from values u(Q) and q(Q) on the virtual border $\Gamma$, the Kirchhoff's integral equation of the Expression 22 can be used.

Generally, in order to derive a relation between the complex amplitude u on the virtual border $\Gamma$ and the complex amplitude u(P) of the point P, there is used a method (refer to the non-patent document 8) in which light incident onto the virtual border $\Gamma$ is approximated by spherical waves and the like, and q on the virtual border $\Gamma$ is obtained by calculating the gradient of the distribution, and is substituted into the Expression 22.

However, there is a problem that an error is caused by using the spherical-wave approximation of mathematical model for light propagation when the light to be measured is not actually spherical waves. More particularly, the error problem caused by using the spherical-wave approximation becomes further remarkable when the scale of the distribution of the light to be measured is approximately of the order of a wavelength. Furthermore, since phase shift from the spherical surface is an object when the light to be measured is a laser beam, there is a problem that the spherical-wave approximation neglecting the object causes an essential contradiction.

The present invention has a configuration in which, in order to solve such a problem, q on the virtual border $\Gamma$ is derived by directly solving the Kirchhoff's integral equation of the Expression 22 under the assumption that complex amplitude u on the virtual border $\Gamma$ is a boundary condition, without making special assumption on an incidence wave (light to be measured), to obtain the relation between the complex amplitude u on the virtual border and the complex amplitude u(P) of the point P.

Figure 6:
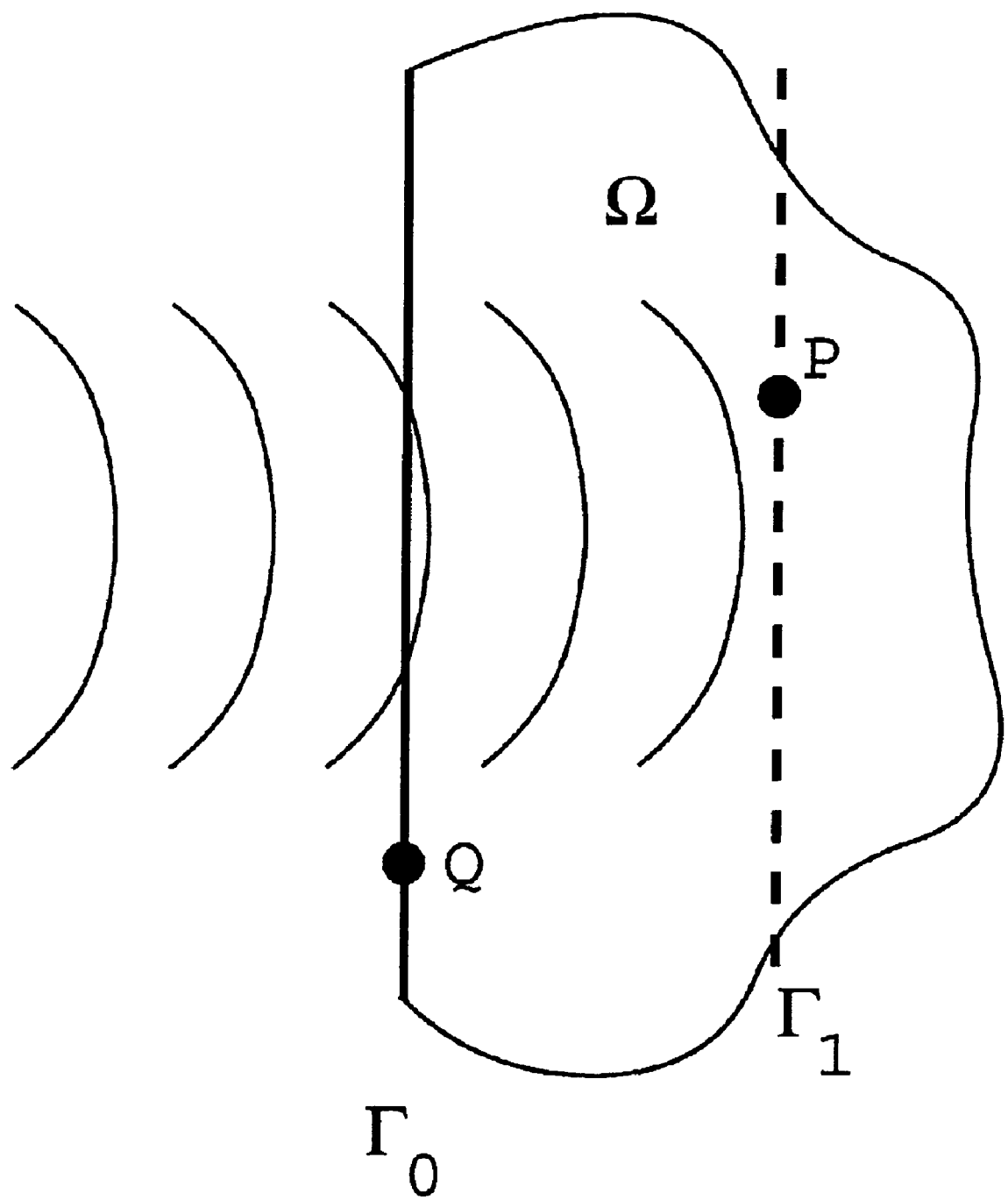
FIG. 6 is a view explaining a transmission matrix for light propagation which is used in the present invention.

Subsequently, a method for obtaining a transmission matrix [H] for light propagation according to the present invention will be specifically explained as follows, referring to FIG. 6.

First, by performing an operation by which the point P is brought near to the virtual border Γ, we can obtain the following Expression 25.

$$\frac{1}{2}u(P) = \int_\Gamma (q^*(P,Q)u(Q) - \phi^*(P,Q)q(Q))d\Gamma(Q) \quad (P \text{ on } \Gamma)$$
[Expression 25]

When the integral equation of the Expression 25 is spatially made discrete for points P on various kinds of virtual borders Γ, a matrix equation represented by the following Expression 26 is obtained.

$$[H_0]u_0 = [G_0]q_0$$
[Expression 26]

Where subscript 0 for u and q represents a value on a 0-th virtual border $\Gamma_0$. When the 0-th virtual border $\Gamma_0$ is a plane, the above-described Expression 26 becomes the following Expression 27.

$$\frac{1}{2}u_0 = [G_0]q_0$$
[Expression 27]

However, i,j component of $[G_0]$ is defined by the following Expression 28.

$$G_0(i,j) = \int_{\Gamma_j} \phi^*(P_i, Q)\psi_j d\Gamma$$
[Expression 28]

Where $\Gamma_j$ is the j-th virtual border which has been made discrete. $\psi_j$ is an interpolation function corresponding to $Q_j$. When the above-described Expression 27 is solved, Expression 29 can be obtained, that is, $q_0$ can be obtained.

$$q_0 = [G_0]^{-1}\frac{1}{2}u_0$$
[Expression 29]

Similarly, a matrix equation represented by the following Expression 30 can be obtained, when the Kirchhoff's integral equation of the Expression 22 is spatially made discrete for various kinds of points P on a first virtual border $\Gamma_1$.

$$u_1 = -[H_1]u_0 + [G_1]q_0$$
[Expression 30]

Where subscript 1 for u and q represents a value on the first virtual border $\Gamma_1$. The Expression 30 is substituted into the Expression 29 to obtain the following Expression 31.

$$u_1 = -[H_1]u_0 + \frac{1}{2}[G_1][G_0]^{-1}u_0$$
$$= \left(-[H_1] + \frac{1}{2}[G_1][G_0]^{-1}\right)u_0$$
[Expression 31]

As described above, a relation between the complex amplitude $u_0$ of light on the 0-th virtual border $\Gamma_0$ and the complex amplitude $u_1$ of light on the first virtual border $\Gamma_1$ can be obtained without making special assumption on an incidence wave (light to be measured) in the present invention. Accordingly, an observation equation with high accuracy can be constructed by using the above relation.

In a word, the transmission matrix for light propagation used in the present invention, that is, the system matrix [H] of optical system in the above-described Expression 11 can be represented by the following Expression 32 in the present invention, if $u_0$ and $u_1$ are assumed to be observation image (that is, intensity-distribution image measured by CCD).

$$[H] = \left(-[H_1] + \frac{1}{2}[G_1][G_0]^{-1}\right)$$
[Expression 32]

Even when the scale of the distribution of the light to be measured is approximately of the order of the wavelength as described above, and even when the aberration (phase) of laser beams is measured, the observation equation can be constructed with high accuracy, because the light to be measured is not approximated by spherical waves not to cause the error made by using the spherical-wave approximation if the optical-phase-distribution measuring method according to the present invention is used. Accordingly, the phase distribution of the light to be measured can be identified with high accuracy.

<6> Speeding up the Optical-Phase-Distribution Measuring m

In the present invention, the phase distribution of light to be measured can be identified at higher speed by using the Fourier transform and the inverse Fourier transform.

First, fundamental calculation procedures of the optical-phase-distribution measuring method according to the present invention will be explained as follows. In this embodiment, the Zernike circle polynomial is used for series expansion of the phase distribution of light to be measured.

Step 1:
An initial value of a coefficient for series expansion of the phase distribution of the light to be measured is set. In this example, an initial value of a coefficient z in the Zernike circle polynomial is set.

Step 2:
Series expansion of the phase distribution of the light to be measured is performed. In this example, the phase distribution φ of the light to be measured is calculated (expanded) by using the following Expression 33.

$$\phi = [W]z$$
[Expression 33]

Step 3:
The complex amplitude g of the light to be measured is calculated by using the following Expression 34.

$$g = g(\phi)$$
[Expression 34]

Step 4:
The complex amplitude f of the light to be measured on the first virtual border is calculated by using the following Expression 35.

$$f = [H]g$$
[Expression 35]

Step 5:
Light intensity is calculated from the complex amplitude of the light to be measured on the first virtual border, wherein the complex amplitude has been calculated at Step 4, and the calculated light intensity (calculated value) and the light intensity detected with CCD (observed value) are compared. The processing is ended when the compared result satisfies an at-end condition (that is, when the objective function of the second nonlinear optimization problem reaches the minimum point), and, on the other hand, when the compared result does not satisfy the at-end condition (that is, when the objective function of the second nonlinear optimization problem does not reach the minimum point), the processing proceeds to Step 6.

Step 6:

The processing returns to Step 2 after correcting the coefficient for series expansion of the phase distribution of the light to be measured. In this example, the processing returns to Step 2 after correcting the coefficient z in the Zernike circle polynomial.

That is, the present invention has a configuration in which the above procedures (that is, Steps 2 to 6) are repeated until the comparison result between the calculated value and the observed value satisfies the at-end condition (that is, the objective function of the second nonlinear optimization problem reaches the minimum point).

For example, when a "quasi Newton method" disclosed in the non-patent document 7 is used for correction of the coefficient, sensitivity to an unknown is required to be calculated at each step. Calculation of the sensitivity at each step is as follows.

Calculation of the Sensitivity of Phase Distribution at Step 2:

The sensitivity of the phase distribution of light to be measured is calculated by using the following Expression 36.

$$\phi_z = [W] \quad \text{[Expression 36]}$$

Calculation of the Sensitivity of the Complex Amplitude of Light to be Measured at Step 3:

The sensitivity of the complex amplitude of the light to be measured is calculated by using the following Expression 37.

$$g_z = [D(g(\phi))][W] \quad \text{[Expression 37]}$$

Calculation of the Sensitivity of the Complex Amplitude of Light to be Measured on the First Virtual Border at Step 4:

The sensitivity of the complex amplitude of the light to be measured on the first virtual border is calculated by using the following Expression 38.

$$f_z = [H][D(g)][W] \quad \text{[Expression 38]}$$

Calculation of the Sensitivity of Intensity Calculated at Step 5:

The sensitivity of the calculated intensity (calculated value) is calculated by using the following Expression 39.

$$|f|_z^2 = 2Re([D(f)][H][D(g)][W]) \quad \text{[Expression 39]}$$

Where [D(g)] is a diagonal matrix with a diagonal section of g.

Moreover, the calculation amount and the memory size at Step 4 become enormous, because the matrix [H] has a dimension n of the number of pixels in an image (intensity image). That is, there is caused a serious problem that the calculation amount of the product is $O(n^2)$, and the memory size also becomes $O(n^2)$ at Step 4.

Since high-speed calculation is required when the optical-phase-distribution measuring method according to the present invention is built into a measuring apparatus, there is caused a problem when the above requirements is realized by using a microprocessor such as a digital signal processor (DSP) with a limited memory size.

The i, j component of the matrix [H] represented by the Expression 32 is a function of a distance $r_{ij}$ between a pixel i and a pixel j. That is, calculation at Step 4, i.e., the calculation of the following Expression 40 can be expressed by "convolution integral".

$$f = [H]g \quad \text{[Expression 40]}$$

Two-dimensional Fourier transform of the above-described Expression 40 is performed to obtain the following Expression 41.

$$f^* = h^* \cdot g^* \quad \text{[Expression 41]}$$

Where * denotes two-dimensional Fourier transform of each distribution. f* is a two-dimensional Fourier transform of f, and g* is a two-dimensional Fourier transform of g. h* is a two-dimensional Fourier transform of a function of integral kernel of the convolution integral. h* is an n-dimensional vector.

Furthermore, h* in expression 41 can be obtained by numerical calculation or by analytically performing Fourier transform as shown in the following expressions.

$$h_1^*(u) = \frac{-\exp\left(-z\sqrt{(2\pi u)^2 - k^2}\right)}{2}$$

$$g_0^*(u) = \frac{1}{4\pi\sqrt{(2\pi u)^2 - k^2}}$$

$$g_1^*(u) = \frac{\exp\left(-z\sqrt{(2\pi u)^2 - k^2}\right)}{4\pi\sqrt{(2\pi u)^2 - k^2}}$$

$$h^* = \int_{\Gamma_j} \left(-h_1^* + \frac{g_1^*}{2g_0^*}\right) d\Gamma$$

where, u is a spatial frequency on image space after Fourier transform. And $\Gamma_j$ represents pixel on image space.

Subsequently, referring to FIG. 7, we will specifically describe procedures for identifying the optical-phase distribution of the light to be measured at higher speed in the present invention, in which there is no necessary to perform calculation of the convolution integral at Step 4 and the Fourier transform and the inverse Fourier transform are employed.

Figure 7:
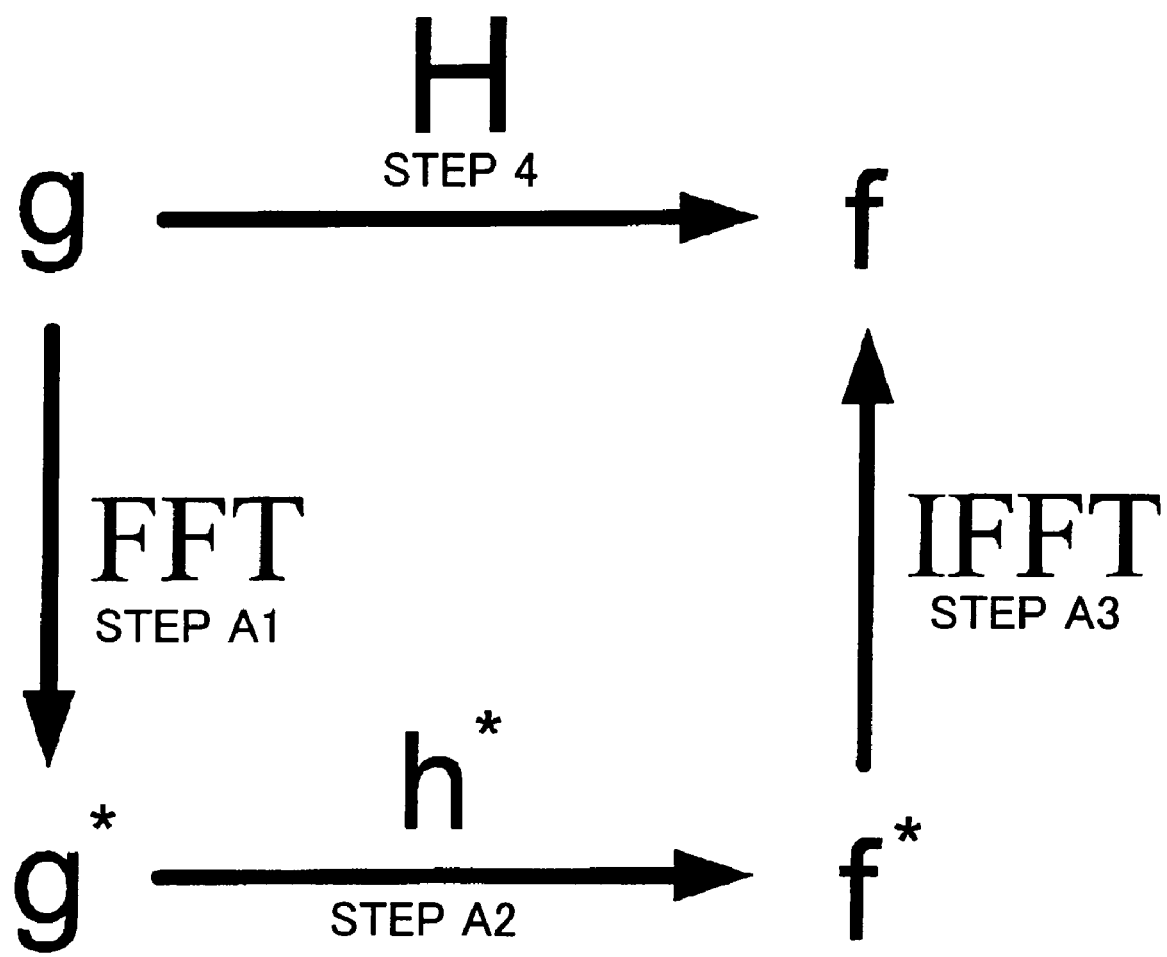
FIG. 7 is a view explaining a principle for further speedup, by using the fast Fourier transform and the inverse fast Fourier transform, in identification of the optical-phase distribution of light to be measured.

In the present invention, in order to identify the optical-phase distribution of the light to be measured at higher speed, as shown in FIG. 7, calculation at Step 4, i.e., calculation of the above-described Expression 40 is performed according to the following procedures without performing calculation of the convolution integral.

Step A1:

When two-dimensional Fourier transform of g is performed, the following Expression 42 can be obtained. Incidentally, the calculation amount of the Expression 42 is O(n).

$$g^* = \mathcal{F}(g) \quad \text{[Expression 42]}$$

Step A2:

The above-described Expression 41 is calculated. Incidentally, the calculation amount of the Expression 41 also is O(n).

Step A3:

When two-dimensional inverse Fourier transform of f* calculated at Step A2, the following Expression 43 can be obtained. Incidentally, the calculation amount of the Expression 43 is O(n log n).

$$f = \mathcal{F}^{-1}(f^*)$$ [Expression 43]

Since, as described above, instead of obtaining f by performing operation at Step 4, f can be also obtained by performing operations at Steps A1 to A3, that is, the Fourier transform of the complex amplitude of the light to be measured (Step A1), by independently performing product operation for each frequency component in an image space (Step A2), and by returning to a real space by the inverse Fourier transform (Step A3), in a word, f can be obtained in the present invention, even without performing calculation of the convolution integral which is required at Step 4 and causes high calculation cost.

Incidentally, in an image case in which n is large, compared to the calculation amount $O(n^2)$ at Step 4, the calculation amount can be remarkably reduced by using the Fourier transform and the inverse Fourier transform as described above. Accordingly, speeding up identification of the optical-phase distribution of the light to be measured can be realized, because the total sum of the calculation amount in the above-described procedures (Steps A1 to A3) is O(n)+O(n)+O(n log n).

Here, it is obvious that further speeding up can be realized when, instead of the Fourier transform and the inverse Fourier transform, the fast Fourier transform (FFT) and the inverse fast Fourier transform (IFFT) are applied to the present invention, that is, the two-dimensional fast Fourier transform (2DFFT) is used at Step A1, and the inverse fast Fourier transform (2DIFFT) is used at Step A3.

What is claimed is:

1. An optical-phase-distribution measuring method for measuring a phase distribution of a light to be measured at high speed and with high accuracy,
said optical-phase-distribution measuring method comprising:
an intensity-distribution measuring step in which an optical-phase-distribution measuring system comprised of two different optical systems with known optical characteristics (a first optical system and a second optical system) and at least a light-wave detecting sensor is used, said light to be measured is input to said first optical system and said second optical system respectively, intensity and phase of said light to be measured are modulated, said light to be measured which has been output is detected by said light-wave detecting sensor, and an intensity distribution of said light to be measured which has been detected is measured as an image;
an observation-equation setting step in which based on said intensity distribution obtained at said intensity-distribution measuring step, optical characteristics of said first optical system, and optical characteristics of said second optical system, an observation equation of said optical-phase-distribution measuring system is set;
a first nonlinear-optimization-problem formulating step in which from said observation equation, a phase-distribution identification inverse-problem by which said phase distribution of said light to be measured is identified is set, and said phase-distribution identification inverse-problem which has been set is formulated as a first nonlinear optimization problem in which a complex amplitude representing said light to be measured is assumed to be a design variable;
a second nonlinear-optimization-problem formulating step in which by performing series expansion of said phase distribution of said light to be measured, said first nonlinear optimization problem is converted to a second nonlinear optimization problem in which expansion coefficients in a series expansion expression are assumed to be design variables; and
a phase-distribution identifying step in which said phase distribution of said light to be measured is identified by solving said second nonlinear optimization problem.

2. An optical-phase-distribution measuring method according to claim 1,
wherein g is said complex amplitude representing said light to be measured, $[H_1]$ is a system matrix representing optical characteristics of said first optical system, $[H_1]^{-1}$ is an inverse matrix of $[H_1]$, and $[H_2]$ is a system matrix representing optical characteristics of said second optical system, $f_1$ is a complex amplitude representing detected light passing through said first optical system, $f_2$ is a complex amplitude representing detected light passing through said second optical system,
when symbols in said observation equation are replaced by $[H] \leftarrow [H_2][H_1]^{-1}$, $g \leftarrow f_1$ and $f \leftarrow f_2$, said observation equation is expressed by the following expression, $$[H]g = f, \ |g| = \bar{g}, \ |f| = \bar{f}$$

objective function of said first nonlinear optimization problem is represented by the following expression.

$$\||Hg|^2 - |f|^2\|^2 \to \min$$

3. An optical-phase-distribution measuring method according to claim 2,
wherein said phase distribution φ of said light to be measured is expanded to a Zernike circle polynomial, Zernike coefficients are assumed to be design variables for said second nonlinear optimization problem, and objective function of said second nonlinear optimization problem is represented by the following expression, $$\||Hg(\phi(z))|^2 - |f|^2\|^2 \to \min$$

where z is a vector comprising a predetermined number of Zernike coefficients.

4. An optical-phase-distribution measuring method according to claim 3,
wherein said phase-distribution identifying step comprising:
Step 1 in which an initial value of a Zernike coefficient z is set;
Step 2 in which said phase distribution φ of said light to be measured is calculated based on $\phi = [W]z$;
Step 3 in which said complex amplitude g representing said light to be measured is calculated based on $g = g(\phi)$;
Step 4 in which complex amplitude f on a first virtual border of said light to be measured is calculated based on $f = [H]g$;
Step 5 in which from said complex amplitude on said first virtual border of said light to be measured which has been calculated at Step 4, light intensity is calculated, calculated light intensity and light intensity detected with said light-wave detecting sensor are compared, and the processing is ended when it is proved by compared result that objective function of said second nonlinear optimization problem reaches a minimum point, on the other hand, the processing proceeds to Step 6 when it is proved by compared result that objective function of said second nonlinear optimization problem does not reach said minimum point; and Step 6 in which the processing returns to Step 2 after correcting said Zernike coefficient z.

5. An optical-phase-distribution measuring method according to claim 4, wherein said complex amplitude f on said first virtual border of said light to be measured which is calculated at Step 4, can be obtained by performing operations of the following Steps A1 to A3:

Step A1 for obtaining g* by two-dimensional Fourier transform of said complex amplitude g representing said light to be measured;

Step A2 for calculating $f^* = h^* \cdot g^*$; and

Step A3 for obtaining said complex amplitude f on said first virtual border of said light to be measured by two-dimensional inverse Fourier transform of $f^*$.

6. An optical-phase-distribution measuring method according to claim 1, wherein the following Kirchhoff's integral equation is applicable to said first optical system and said second optical system, $$u(P) = -\int_\Gamma (q^*(P,Q)u(Q) - \phi^*(P,Q)q(Q)) d\Gamma(Q)$$

by directly solving said Kirchhoff's integral equation under the assumption that a complex amplitude u on a virtual border $\Gamma$ is a boundary condition, q on said virtual border $\Gamma$ can be derived without making special assumption on said light to be measured, and then, a relation between said complex amplitude u on said virtual border $\Gamma$ and a complex amplitude u(P) of a point P can be obtained.

7. An optical-phase-distribution measuring method for measuring a phase distribution of a light to be measured at high speed and with high accuracy, said optical-phase-distribution measuring method comprising:

an intensity-distribution measuring step in which an optical-phase-distribution measuring system comprised of a plurality of different optical systems with known optical characteristics and at least one light-wave detecting sensor is used, said light to be measured is input to said plurality of optical systems respectively, intensity and phase of said light to be measured are modulated, said light to be measured which has been output is detected by said light-wave detecting sensor, and an intensity distribution of said light to be measured which has been detected is measured as an image;

an observation-equation setting step in which based on said intensity distribution obtained at said intensity-distribution measuring step and each optical characteristics of said plurality of optical systems, an observation equation of said optical-phase-distribution measuring system is set;

a first nonlinear-optimization-problem formulating step in which from said observation equation, a phase-distribution identification inverse-problem by which said phase distribution of said light to be measured is identified is set, and said phase-distribution identification inverse-problem which has been set is formulated as a first nonlinear optimization problem in which a complex amplitude representing said light to be measured is assumed to be a design variable;

a second nonlinear-optimization-problem formulating step in which by performing series expansion of said phase distribution of said light to be measured, said first nonlinear optimization problem is converted to a second nonlinear optimization problem in which expansion coefficients in a series expansion expression are assumed to be design variables; and a phase-distribution identifying step in which said phase distribution of said light to be measured is identified by solving said second nonlinear optimization problem.

* * * * *